US008261668B2

(12) United States Patent
Weinbaum et al.

(10) Patent No.: US 8,261,668 B2
(45) Date of Patent: Sep. 11, 2012

(54) PROPULSION VEHICLE WHICH TRAVELS ALONG A SOFT, POROUS TRACK

(75) Inventors: Sheldon Weinbaum, Brooklyn, NY (US); Yiannis Andreopoulos, Orangeburg, NY (US); Parisa Mirbod, New York, NY (US)

(73) Assignee: Research Foundation of the City University of New York, New York, NY (US)

( * ) Notice: Subject to any disclaimer, the term of this patent is extended or adjusted under 35 U.S.C. 154(b) by 0 days.

(21) Appl. No.: 13/001,997

(22) PCT Filed: Jun. 30, 2009

(86) PCT No.: PCT/US2009/049260
§ 371 (c)(1),
(2), (4) Date: Sep. 2, 2011

(87) PCT Pub. No.: WO2010/002894
PCT Pub. Date: Jan. 7, 2010

(65) Prior Publication Data
US 2011/0308422 A1    Dec. 22, 2011

Related U.S. Application Data

(60) Provisional application No. 61/077,382, filed on Jul. 1, 2008.

(51) Int. Cl.
*B60V 3/04*    (2006.01)
(52) U.S. Cl. .................. 104/23.2; 104/23.1; 104/69
(58) Field of Classification Search .................. 104/23.1, 104/23.2, 69
See application file for complete search history.

(56) References Cited

U.S. PATENT DOCUMENTS 3,470,827 A * 10/1969 McLean ................. 104/134
3,566,797 A *  3/1971 Giraud ................... 104/23.2
(Continued)

FOREIGN PATENT DOCUMENTS

JP          6122301 A      5/1994
(Continued)

OTHER PUBLICATIONS

An International Search Report mailed Feb. 17, 2010, which issued in corresponding International Application Serial No. PCT/US2009/049260.

*Primary Examiner* — S. Joseph Morano
*Assistant Examiner* — Jason C Smith
(74) *Attorney, Agent, or Firm* — Fish & Richardson P.C.

(57) ABSTRACT

A vehicle track including a soft porous material and a vehicle which rides on the track by skiing cm the soft porous material. The vehicle has a large ski surface that rides on the soft porous material, supporting the weight of the vehicle at high speeds. Air within the soft porous material supplies most of the lift needed to support the train, Only a small amount of the support is provided by the structure of the porous material itself when the vehicle is in motion. As a result, the friction between the soft porous material and the ski surface may also be exceedingly small. To increase the amount of lift provided by the soft porous material it can be contained within a channel having impermeable sides and bottom. If the ski surface is substantially the same width as the channel, the impermeable sides prevent the air from escaping on either side of die ski surface. Accordingly, the trapped air contributes to greatly enhanced lift force. At lower speeds the vehicle can use wheels to support some or all of its weight. These wheels can ride on rails that are part of the track. The vehicle includes a propulsion system that is independent of the wheels so that it may travel over the soft porous material without running on the wheels.

20 Claims, 5 Drawing Sheets

U.S. PATENT DOCUMENTS

| | | | |
|---|---|---|---|
| 3,583,323 A * | 6/1971 | Paris et al. | 104/23.2 |
| 3,613,821 A * | 10/1971 | Kerr et al. | 180/125 |
| 4,843,969 A * | 7/1989 | Chaffee et al. | 104/23.2 |
| 5,909,710 A * | 6/1999 | Cummins | 104/23.2 |
| 2002/0069785 A1* | 6/2002 | Knapp | 104/23.2 |
| 2003/0038451 A1* | 2/2003 | Bouchard | 280/415.1 |
| 2010/0326311 A1* | 12/2010 | Simon | 104/23.1 |
| 2011/0308422 A1* | 12/2011 | Weinbaum et al. | 104/23.2 |

FOREIGN PATENT DOCUMENTS

| | | |
|---|---|---|
| JP | 06122301 A * | 5/1994 |
| JP | 8282482 A | 10/1996 |
| JP | 08282482 A * | 10/1996 |
| KR | 701216 B1 | 3/2007 |

* cited by examiner

PROPULSION VEHICLE WHICH TRAVELS ALONG A SOFT, POROUS TRACK

CROSS REFERENCE TO RELATED APPLICATIONS

This application is the U.S. national stage under 35 USC §371 of International Application Number PCT/US2009/049260, filed on Jun. 30, 2009, which claims the benefit of priority under 35 USC §119(e) of U.S. Provisional Patent Application No. 61/077,382, filed Jul. 1, 2008, which are both is hereby incorporated by reference in their entirety.

FEDERAL RIGHTS STATEMENT

The U.S. Government may have certain rights to the invention based on National Science Foundation grant #0432229 and National Institutes of Health grant HL44485.

FIELD OF THE INVENTION

The invention relates to high speed vehicles, and specifically relates to a vehicle that travels on a track with a soft porous material.

BACKGROUND

High speed surface transit is ideal for carrying passengers between city centers in short travel times. However, conventional surface transit, using wheels at high speeds generates noise and subjects the mechanical components of the wheels and axles to high stress levels. Also, the slightest irregularity on the track can result in unacceptable bumps and jarring of the passengers. Other high speed surface transit systems avoid these drawbacks, such as Maglev trains and hover crafts. However, each of these types of levitation systems require a mechanism to lift the vehicle off the surface it is traveling over. In each case, the mechanism used to lift the vehicle is complex and bulky and expends a substantial amount of energy merely to levitate the vehicle.

Air travel is a popular alternative to surface transit, but flying expends large amounts of energy and fuel to lift the plane and its cargo to a cruising altitude. In many cases up to 75% of fuel consumption is expended only to bring the plane to its cruising altitude than on shorter duration flights. Thus, flying is less efficient than surface transit and creates more pollution and emissions since green house gases, in particular $CO_2$ are released, high in the atmosphere where photosynthesis is absent. Additionally, airports are typically outside of city centers and require additional travel to and from the airport. Thus, there is an ever-present desire to improve surface transit.

SUMMARY OF THE INVENTION

The present invention provides a vehicle track including a soft porous material and a vehicle which rides on the track by skiing on the soft porous material. The vehicle has a large ski surface that rides on the soft porous material, supporting the entire weight of the vehicle at high speeds. Air within the soft porous material supplies most of the lift needed to support the train. Less than 0.1 percent of the support is provided by the structure of the porous material itself when the vehicle is in motion. As a result, the friction between the soft porous material and the ski surface is nearly negligible, since friction between the ski surface and porous material is proportional to the support force provided by the material itself. To increase the amount of lift, the soft porous material is confined within a channel having impermeable sides. If the ski surface is substantially the same width as the channel, the impermeable sides prevent the air from escaping on either side of the ski surface. Accordingly, the lift force of the trapped air is vastly increased. At lower speeds the vehicle can use wheels to support some or all of its weight. These wheels can ride on rails that are part of the track. The vehicle includes a propulsion system that is independent of the wheels so that it may travel over the soft porous material without running on the wheels. In an exemplary embodiment of the invention, the propulsion system includes jet engines.

BRIEF DESCRIPTION OF THE FIGURES

A detailed description of an embodiment of the present invention is described in the following with reference made to the drawings, in which.

DETAILED DESCRIPTION

Figure 1:
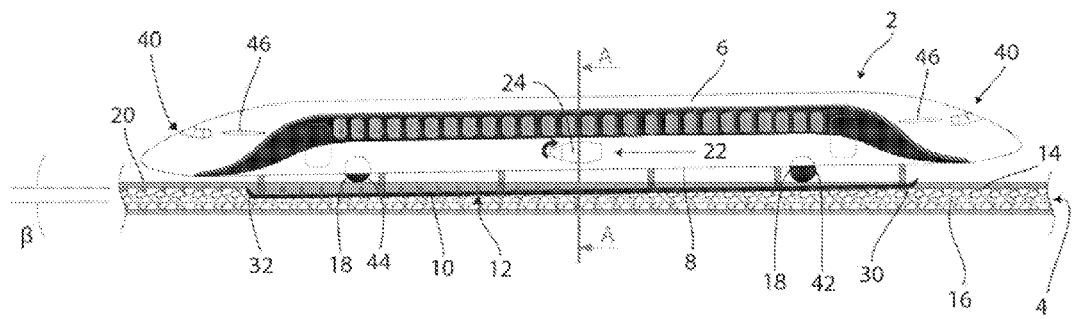
FIG. 1 shows an embodiment of a train in accordance with the present invention in a first position.
Figure 2:
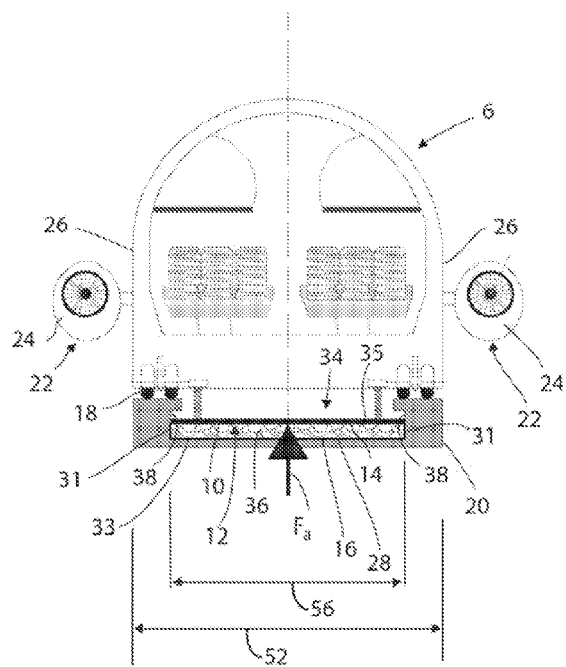
FIG. 2 shows a cross-sectional view of the train shown in FIG. 1 taken along line A-A.

An exemplary embodiment of the vehicle and track of the present invention is shown in FIGS. 1-4. The vehicle is shown in this embodiment as train 2 that includes a single car 6. Ski 10 is attached to underside 8 of train car 6. Ski 10 includes ski surface 12 that is supported by top surface 14 of porous material 16 that is part of the track 4 of the present invention. The train also includes wheels 18 that ride on rails 20 of track 4. When train 2 is moving at slow speeds, wheels 18 can support the entire weight of train 2. However, as train 2 increases in speed, the use of wheels 18 can be eliminated once the train has achieved a predetermined lift-off velocity. The primary source of propulsion for train 2 is provided by propulsion system 22 that is independent of wheels 18. In the exemplary embodiment, propulsion system 22 includes two jet engines 24 that are respectively attached to sides 26 of train car 6, as shown in FIG. 2.

Figure 5:
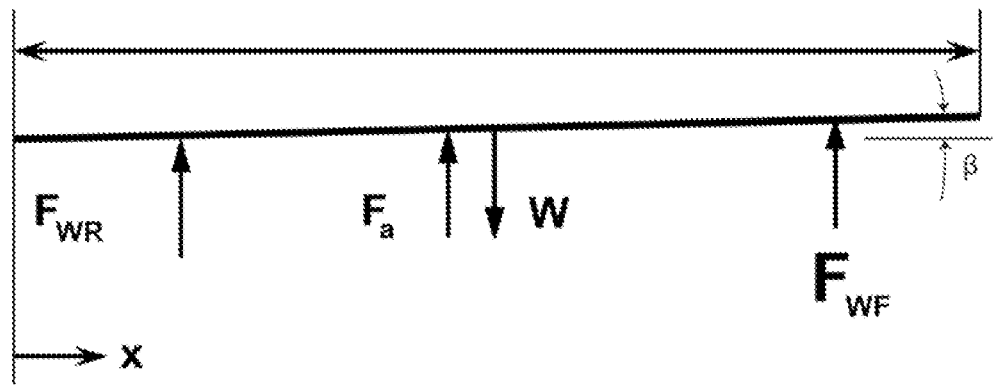
FIG. 5 is a moment diagram showing the various lift forces and weight of the train.

Air that is held within porous material 16 of track 4 provides lift force $F_a$, shown in FIG. 5, on ski 10 that is adequate to support most of the weight of train 2 at remarkably low speeds. The source of this lift force $F_a$ is best demonstrated with reference to FIG. 1 which shows ski 10 held at a very small tilt angle β with respect to the horizontal. As demonstrated by the direction of jet engine 24, the direction of motion of the train is to the right in the figures. As shown in FIG. 1, front end 30 of ski 10 is positioned at the natural uncompressed height of top surface 14 of porous material 16, while trailing edge 32 of ski 10 is positioned below the natural position of top surface 14, porous material 16 at trailing edge 32 being slightly compressed. The lift force $F_a$ is provided by a combination of air movement through the porous material 16 and the confining channel formed by impermeable bottom 33 and sidewall 31 boundaries and the ski 12 at tilt angle β. The rate at which air can escape porous material 16 when it is compressed is dependent on the permeability of material 16. If porous material 16 is compressed for only a short duration, the air cannot easily escape as it would over time. Accordingly, when porous material is compressed for only a short duration the air inside the porous material provides a large counter force to the compression. Thus, as ski surface 12 moves over porous material 16, the air in the slightly compressed porous material provides a lift force that greatly exceeds the force that would be present if the porous material were absent. Further, because ski has a downward tilt angle β toward trailing edge 32 of ski surface 12, the compression of porous material 16 and the air therein is continuously increased along the length of the ski, such that a lift force by the air acts on the entire length of the ski. The resulting reaction force from the air is a large lift force F, that can support train 2 even at low speeds.

The cross-sectional area of the track shown in FIG. 2 demonstrates how the configuration of the track enhances the lift force $F_a$ provided by the air in porous material 16. As shown in FIG. 2, porous material 16 can be held in trench 34 having impermeable solid bottom 36 and side boundaries 31 and a protective screen 35 on top. Furthermore, porous material 16 may be contained in a channel 28 with an impermeable membrane liner 33 surrounding porous material 16 and including right and left sides 31, bottom 36 and a protective screen 35 on top. The protective screen 35 may be a highly porous, light weight protective screen that rests on top of the porous layer to protect it from deterioration and debris. The protective screen can be either fastened to the channel bottom by flexible straps or have slender prongs that penetrate the porous material to help prevent the relative motion of the porous material and the screen. Similarly the bottom boundary 36 can have prongs that extend into the porous material to prevent its motion or an adhesive can be used for this same purpose. Although the train can travel at speeds approaching 700 km/hr the relative velocity of the air and the stationary porous material is at most a few tens of cm/s and thus the drag force on the fibers themselves is very small. The porosity of screen 35 allows the force of the compressed air within porous material 16 to act directly on ski surface 12. The screen 35 can be made of plastic and may include a low friction coating thereon, such as Teflon. Alternatively, the screen 35 itself may be made of a low friction material. In one embodiment, sides 31 and bottom 36 of the channel 28 are made of an impermeable solid material. In another embodiment, sides 31 and bottom 36 can be made of an impermeable plastic membrane. In this embodiment, sides 31 and bottom 36 also form an impermeable channel surrounding porous material 16 except on its top surface, but the bottom and sidewalls can now be porous. In this case, the plastic membrane of sides 31 is also elastic and will compress with the compression of porous material 16. Because sides 31 are impermeable, if ski surface 12 of train 2 has substantially the same width 56 as trench 34 and channel 28, sides 31 will prevent air from leaking out of porous material 16 at the sides of ski 10. Accordingly, air that escapes out of the porous material 16 may only escape at front end 30 or trailing edge 32 of ski 10. This prevention of air leakage at the sides of the ski can greatly enhance the lift force $F_a$ generated by the air in porous material 16. Alternatively, sides 31 of trench 34 may be impermeable and trench 34 may itself form the impermeable channel and prevent the air in porous material 16 from escaping. The prevention of air leakage may also be enhanced by including felt slider strips at the right and left sides of protective screen 35. As a result, air in porous material 16 will be prevented from escaping at the sides of screen even if the ski surface does not perfectly extend to the edges of screen 35.

Due to the restriction of air in the lateral direction of porous material 16 caused by the impermeable sides, the lift force on the inclined planar surface (ski surface 12) of ski 10 can be greatly enhanced. This can be shown using a generalized lubrication theory based on effective medium theory (Brinkman equation) if the porous layer is firmly attached to a stationary flat boundary at the lower side of porous material 16. The magnitude of the pressure depends on three dimensionless parameters, $\alpha = H/\sqrt{K_p}$, where H is the characteristic thickness of the layer and $K_p$ is the Darcy permeability, the aspect ratio of the inclined planar surface, L/W, where L is its length and W its width, and the tilt angle of the planform or ski surface 12, $k = h_1/h_2$ which describes the ratio of the fiber layer thicknesses, $h_1$ and $h_2$ at the leading and trailing edges of the ski surface. Accordingly, the dimensionless lift force per unit width W, $Fh_1^2/\mu UL^2$, where $h_1 = H$ is the undeformed layer thickness, is nearly constant for $\alpha < 1$, but for $\alpha > 10$ increases as $\alpha^2$ independent of the value of k or L/W. It has been found that in this large $\alpha$ limit that if the pressure is scaled by $\alpha^2$, the resulting dimensionless pressure and lift force $Fh_1^2/\alpha^2\mu UL^2 = FK_p(H)/\mu UL^2$ collapse into a single curve which is a function of $k = h_1/h_2$, but independent of the layer thickness H for a prescribed $K_p(H)$. Thus, for a given $K_p(H)$ the thickness of the layer does not enter into the solution for the lift.

Figure 6A:
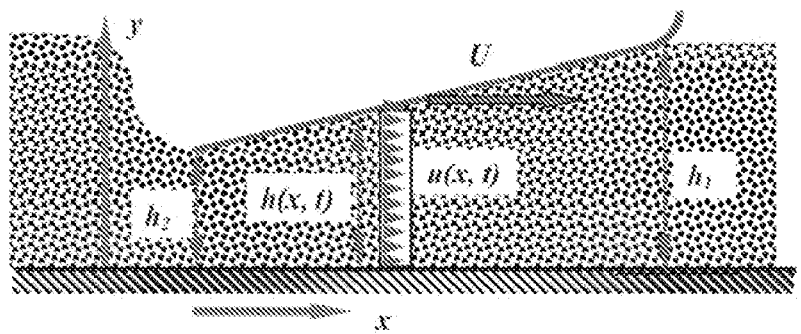
FIGS. 6A and 6B show flow geometry with respect to the ski surface and porous material in reference frames fixed to the ground and moving with the train respectively.

The basic flow geometry for the planar lifting surface is shown in FIG. 6A. An inclined planar lifting surface of length L is moving to the right with velocity U compressing a soft porous material in a channel of width W with impermeable sidewalls. The fiber layer is firmly attached to the flat, rigid, bottom boundary of the channel. Due to the tilt of the inclined moving upper boundary, air is also pushed through the fiber layer in the x direction with a velocity u(x,t) that depends on the tilt parameter $k = h_1/h_2$ and the local variation of the Darcy permeability $K_p$. $K_p$ is assumed to vary only with x since the compression in the vertical y direction is assumed to be uniform. Due to the impermeable sidewalls one needs to consider only unidirectional flow in the x direction. Furthermore, if both L and W are >>H, the characteristic thickness of the layer, one can apply the classical approximation in lubrication theory that the pressure is constant across the local fiber layer thickness. The equation governing this flow has been derived for an arbitrary value of the dimensionless permeability parameter α. However, since α is of order $10^3$ and thus >>>1, a much simpler asymptotic analysis can be employed. In this limit, the complicated velocity profile u=u(x,y,t) in the porous layer becomes independent of y and reduces to a plug flow. Basically, the thickness of the fiber interaction boundary layers at the top and bottom boundaries are of order $\sqrt{K_p}$ and for $\alpha = H/\sqrt{K_p} = 1000$ and H=20 cm, $\sqrt{K_p} = 0.2$ mm. Thus, outside these thin layers the velocity is locally uniform across the height h(x,t) and u=u(x,t). Thus, one essentially has a slip velocity at the confining boundaries which is typical of a Darcy flow.

Figure 6B:
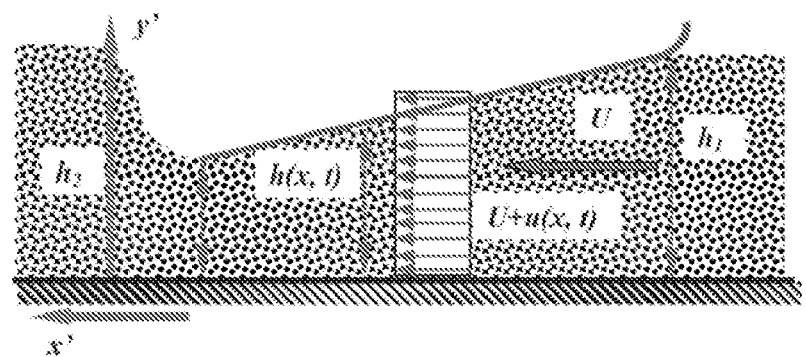

The problem sketched in FIG. 6A is inherently unsteady in the coordinate system of the stationary lower boundary with its attached fiber layer and the local height of the inclined upper boundary is time varying, h=h(x,t). However, the flow can be transformed into a steady reference frame where the observer sits on the inclined upper boundary and the lower boundary with its attached fiber layer moves beneath it with velocity U=−Ui as observed in FIG. 6B. The Darcy equation, $u(x)=-(K_p/\mu)dp/dx$, depends on the frame of the observer since it describes the relative motion $u-U=(u+U)i$ of the fluid and solid constituents where $u=ui$ is the absolute velocity of the air in the steady transformed (x',y') coordinate system. The generalized Darcy equation describing this relative motion in the (x',y') coordinate system is given by $$u + U = -\frac{K_p}{\mu}\frac{dp}{dx'}, \quad (1)$$

Introducing the dimensionless variables $$\tilde{x} = \frac{x'}{L}, \tilde{h} = \frac{h}{H}, \tilde{P} = \frac{pK_p(H)}{\mu U L}, \tilde{u} = \frac{u}{U}, \tilde{K}_p \infty \frac{K_p(h)}{K_p(H)}, \quad (2)$$

where $K_p(H)$ is the reference permeability at the reference height H, Eq. 1 can be rewritten as $$\frac{d\tilde{P}}{d\tilde{x}} = -\frac{\tilde{u}}{\tilde{K}_p} - \frac{1}{\tilde{K}_p}. \quad (3)$$

In this steady frame the local volume flux Q' (integral of u across the layer) is a constant from continuity. The value of this constant can be found by integrating Eq. 3 from $\tilde{x}=0$ to $\tilde{x}=1$ and requiring that the pressure at the leading, and trailing edges be equal to the atmospheric pressure $P_o$, $$\frac{Q'}{Q'_0} = -\frac{\int_0^1 \frac{1}{\tilde{K}_p}d\tilde{x}}{\int_0^1 \frac{1}{\tilde{K}_p\tilde{h}}d\tilde{x}} = C_1, \quad (4)$$

where $Q_0'=UH$ is a reference flux.

The pressure distribution is given by $$\tilde{P}(\tilde{x}) - \tilde{P}_0 = -\int_0^{\tilde{x}} \frac{C_1 + \tilde{h}}{\tilde{K}_p \tilde{h}} d\tilde{x}. \quad (5)$$

The dimensionless lift force $F=FWK_p(H)/\mu L^2 U$, where F is the dimensional lift per unit width, is the integral of Eq. 5. The variation of $\tilde{K}_p$ with $h(\tilde{x})$ is determined from a Carman-Kozeny equation that takes account of the change in solid fraction with the variation in h as described in the next section.

For a planar planform, one can describe the variation of $\tilde{h}$ with $\tilde{x}$ as $$\tilde{h}(\tilde{x})=\tilde{h}_2+(\tilde{h}_1-\tilde{h}_2)\tilde{x}, \, 0\leq\tilde{x}\leq 1 \quad (6)$$

and $$d\tilde{h}=(\tilde{h}_1-\tilde{h}_2)d\tilde{x}, \quad (7)$$

Thus, the variable $\tilde{x}$ in Eqs. 4 and 5 can be replaced by $\tilde{h}$. For variable $\tilde{K}_p$, the integral in Eq. 5 needs to be evaluated numerically, however for $\tilde{K}_p$, constant, Eq. 5 can be integrated analytically, such that:

$$\tilde{P}(\tilde{x}) - \tilde{P}_0 = -\frac{1}{(\tilde{h}_1-\tilde{h}_2)}\int_{\tilde{h}_1}^{\tilde{h}} \frac{C_1+\tilde{h}}{\tilde{K}_p\tilde{h}}d\tilde{h} \quad (8)$$

$$= \frac{-C_1}{\tilde{K}_p(\tilde{h}_1-\tilde{h}_2)}\ln\left(\frac{\tilde{h}}{\tilde{h}_2}\right) - \frac{\tilde{h}-\tilde{h}_2}{\tilde{K}_p(\tilde{h}_1-\tilde{h}_2)},$$

where $$C_1 = -\frac{\int_{\tilde{h}_2}^{\tilde{h}_1} d\tilde{h}}{\int_{\tilde{h}_2}^{\tilde{h}_1} \frac{1}{\tilde{h}}d\tilde{h}} = -\frac{(\tilde{h}_1-\tilde{h}_2)}{\ln\left(\frac{\tilde{h}_1}{\tilde{h}_2}\right)}. \quad (9)$$

Figure 7:
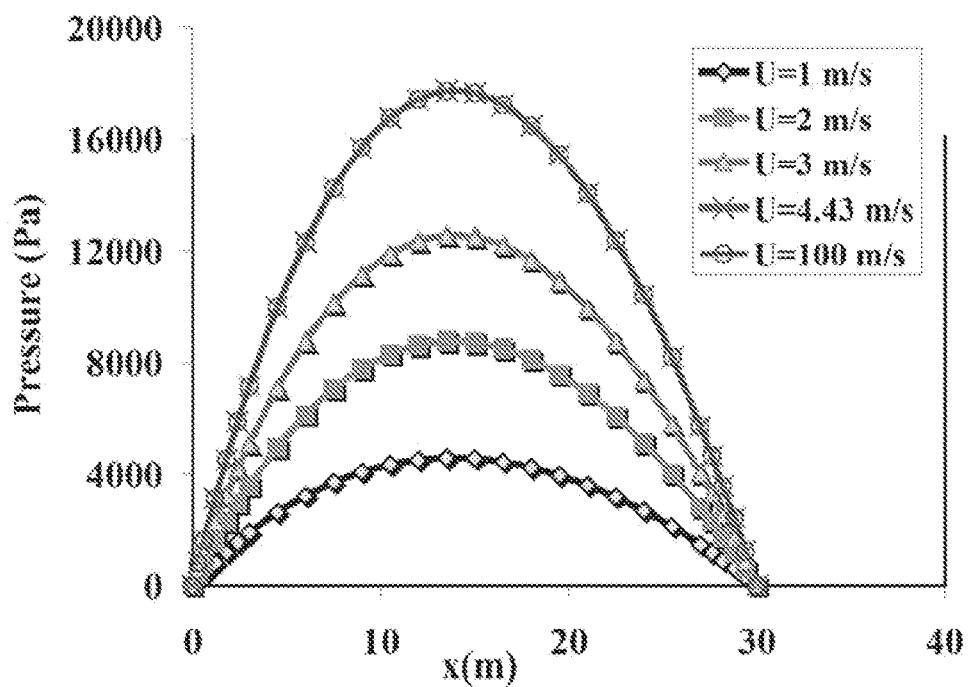
FIG. 7 is a plot showing the pressure distribution beneath the ski over its length beneath an exemplary embodiment of the train as it velocity increases to a predetermined lift-off velocity.

The resulting pressure profile is similar to those shown in FIG. 7, which correspond to the exemplary embodiment described in more detail below.

In an embodiment of the track of the invention, in the case where an elastic membrane 28 covers the bottom and sidewalls of trench 34 containing the porous material 16 the membrane may be anchored to the bottom of trench 34 periodically, for example, every few meters. Alternatively, bottom 33 of elastic membrane 28 could be attached to bottom 36 of trench 34 using adhesive. In this case, elastic membrane 28 could be continuously attached to trench 34.

In the exemplary embodiment shown in FIG. 2, sides 38 of trench 34 provide a dual function of also serving as rails 20 for wheels 18 of train 2. In this embodiment, the width of track 52 is determined by the distance between sides 38. In another embodiment, sides 38 and rails 20 may each be separate elements.

The porous material 16 used in track 4 is soft and permeable, such that it can be compressed and allow air to move within the material and escape there from. An advantageous porous material is also able to support most of the weight of the train at slow speeds. One objective is that the porous material produce nearly negligible friction drag on the bottom of the ski 12. Further, it is advantageous if the maximum compression of porous material 16 is a small percentage of the total thickness of porous material 16. The ability of porous material 16 to meet these characteristics depend on the permeability and the restorative properties of the material.

A matrix of fibers, such as those used in conventional pillows, has been found to have desirable properties for porous material 16. The fiber matrix can be configured such that the permeability allows air in porous material 16 to support the weight of the train at low speeds and with a small but significant amount of compression of porous material 16 with respect to the overall height. Further, the restorative ability of porous material 16 depends greatly on the diameter of the fibers, because the flexural rigidity of the fibers, EI, where E is their Young's modulus and I the moment of inertia of their cross-section, varies as the fourth power of their diameter. Accordingly, for a porous material 16 made of a fibrous matrix, the height of the material can be restored easily with a small restoring force if the diameter of the fibers is set appropriately.

Theoretical predictions show that a desirable fibrous material should have a radius of between 3 μm and 10 μm. Such porous materials are usually manufactured with nearly uniform radius. In an exemplary embodiment, a fibrous material of substantially uniform radius of 5 μm was tested, and was found to have a length of fiber per unit volume of material of approximately 6000 cm/cm$^3$ in an undeformed state. Typical materials are made of polyester fibers, or a combination of polyester and silk fibers. For example, the fibrous material may be approximately 95% polyester and approximately 5% silk. The density of such a fibrous material is approximately 1.4 g/cm$^3$. These characteristics correspond to a solid fraction of about 0.0047 and a value of $K_P$, the dimensional Darcy permeability, of $3.4 \times 10^{-5}$ cm$^2$. It also results in a void fraction of about 0.995.

To protect the track and porous material 16 therein, the train may be covered such that the train runs within an open air but partially covered recessed roadway beneath the ground surface. The cover and sidewalls would provide both noise control and protect the track from weather.

As it is illustrated in the figures, ski surface 12 can be part of ski 10 that slides on top surface 14 of porous material 16. Ski 10, as it is shown, can extend from underside 8 of train car 6 on short vertical supports 48. However, ski surface 12 may also be integrally formed with underside 8 of train car 6, such that train 2 itself rides on top surface 14 of porous material 16. Ski 10 is preferably made of a rigid material and the ski surface 12 is low friction. For example, the entire ski 10 and ski surface 12 can be made of a low friction metal, such as aluminum, or the ski 10 can be made of another material, such as steel and coated with a low friction coating, such as Teflon.

Train 2 of the described exemplary embodiment of the invention includes one car 6 that is propelled by propulsion system 22 including two jet engines 24 on either side of car 6. Car 6 has two heads 40 and is configured to be driveable in either direction. To reverse the direction of train 2, the two jet engines 24 may be rotated to face the reverse direction. Thus, the train can move forward and backward on the track without having to turn around. Although jet engines 24 are used in the exemplary embodiment, propulsion system 22 could include other means for moving the train. For example, propulsion system 22 could include an electromagnetic propulsion system or propellers. At slower velocities, it may be desirable for the train to be movable using a different type of the propulsion system. For example, wheels 18 on the train may also be driven by motors to propel the train. At higher velocities, wheels 18 may be retracted into train 2 when not in use.

Figure 3:
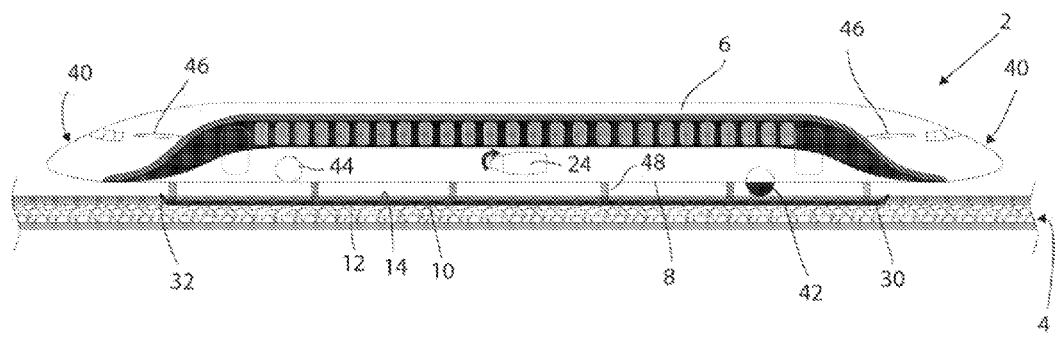
FIG. 3 shows the train in FIG. 1 in a second position.
Figure 4:
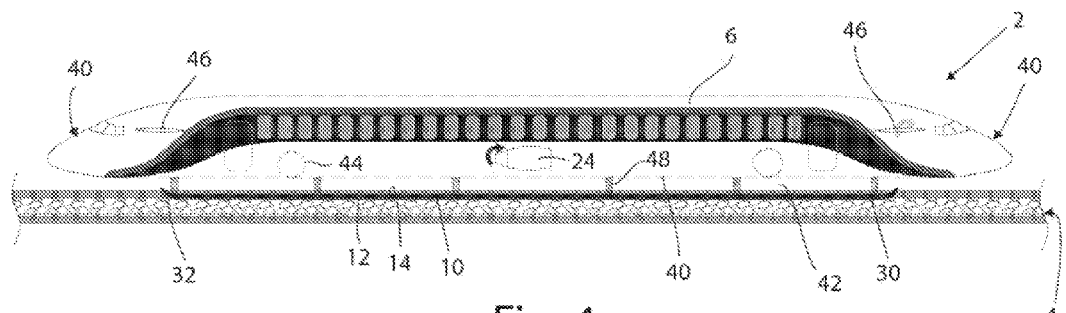
FIG. 4 shows the train in FIG. 1 in a third position.

In operation, as the train first begins to move, it is entirely supported by the wheels 18, as shown in FIG. 1. The force from the front wheels $F_{wF}$ and the force from the rear wheels $F_{wR}$ collaboratively support the train at its front and rear ends, respectively, as shown in FIG. 5. At starting speeds, front wheels 42 are extended so that the front of ski 10 rests at top surface 14 of porous material 16 at its original height, i.e. its height without any compression. In contrast, rear wheels 44 are slightly retracted into train 2 so that ski 10 has a tilt angle of β and trailing edge 32 of ski 10 rests within porous material 16 compressing it, as shown in FIG. 1. As train 2 begins to move forward, which is to the right in FIGS. 1, 3 and 4, the air within porous material 16 begins to provide a lift force $F_a$ on ski 10 and consequently on train 2 as a whole. The resultant lift force $F_a$ on ski 10 is located just behind the center of gravity of the train where the resultant weight force W acts, as shown in FIG. 5. As the train 10 gains speed, the lift force $F_a$ is soon able to support almost the entire weight of the train and the force provided by the rear wheels $F_{wR}$ decreases to zero. Further, with increased speed, the tilt angle β required to generate enough lift to support the train decreases. Therefore, rear wheels 44 can be fully retracted into train 2. However, the resultant lift force is situated behind the center of gravity. This causes two opposite forces on ski 10, the weight and the lift, that are separated along the length of the train, as shown in FIG. 5. As a result, the train is subjected to a turning moment forcing front head 40 of the train downward. Accordingly, to balance the forces on the train, the front wheels 42 are used to hold head 40 of the train 2 up, as shown in FIG. 3. The front wheels 42 are adequate to hold train 2 steady as it is propelled along the track. However, wheels 42 are subject to bumps and vibration. As a smoother alternative to using front wheels 42 to counter the turning moment, the train may include adjustable airfoils 46 to provide additional lift. When the train velocity is high enough, the airfoil at front head 40 of the train can be pivoted to provide additional lift at the head of the train. The added lift from the airfoil is able to counter the turning moment so that front wheels 42 are no longer necessary. Thus, as shown in FIG. 4, at high velocities front wheels 42 may also be retracted into the train so that the train is entirely supported by, or skiing on, porous material 16 of track 4.

When operating the train in the reverse direction, the wheels are extended in a reverse fashion so that the ski is tilted in the opposite direction. As mentioned above, propulsion system 22 is also reversed. A second adjustable airfoil 46 is provided at the back end of the train, so that it can be used when moving in the reverse direction as well. The description above only discusses front and rear wheels. However, in another embodiment the train may include a plurality of wheels along its length that operate together so that the train is tilted at the desired tilt angle β. In an alternative embodiment of the present invention, legs 48 that support ski 10 may be extended or retracted to adjust the tilt angle β. Regardless of which embodiment is used, wheels 18 are adjusted with respect to ski surface 12 such that ski surface 12 may be at an angle with respect to top surface 14 of porous material 16.

In order to turn the train, ski surface 12 may be configured to curve with respect to the direction of travel. For example, ski surface 12 may be formed from a plurality of panels. These panels may overlap and slide with respect to one another, such that ski surface 12 can be adjusted to have a defined curvature by sliding the overlapped panels into a curved configuration. Accordingly, the train could navigate turns while ski surface 12 remained within the track. Alternatively, ski surface 12 may be configured to be raised when the train needs to make a turn. Thus, before a turn, the train would slow down and wheels 18 would engage rails 20 and support the weight of the train. Subsequently, ski surface 12 would be raised above impermeable sides 38 of the track and the train would turn using wheels 18.

In an embodiment of the invention, the train has the following dimensions. The length of train 2 from the end of front head 40 to the end of back head 40 is about 40 meters and train car 6 is about 4 meters wide. In total, the train is about 40 metric tons and adapted to hold another 20 metric tons in passengers and baggage and 10 metric tons in fuel. In one embodiment, the train is configured to hold about 200 passengers. The height of the train car itself is about 3 meters. The distance from front end 30 of ski 10 to front wheels 42 is about 5 meters and the distance from trailing edge 32 of ski 10 to rear wheels 44 is also about 5 meters. Ski has a planform with ski surface 12 of 90 square meters including a width of 3 meters and a length from front end 30 to trailing edge 32 of about 30 meters. The track on which the train rides has a corresponding width of about 3 meters between sides 38 such that porous material 16 also has a width of about 3 meters. The thickness of soft porous material 16 is about 20 cm.

The following is a description of a specific example of the described embodiment of the present invention in use. The described example has the above described dimensions, with each length and weight as given above. When the train is completely stopped, rear wheel 44 is retracted to such a degree that ski 10 is at an angle β with respect to top surface 14 of porous material 16. As a result, trailing edge 32 of the ski compresses porous material 16 beneath it 4 cm. As train 2 begins to move forward, ski 10 pushes the air beneath tilted ski surface 12 and out the front end of ski 10. The air that is trapped in porous material 16 beneath the tilted ski 10 has a pressure distribution along the length of the ski that is greatest at the center of ski 10. The pressure distribution curve rapidly increases as the velocity of the train is increased. The pressure distribution over the length of the 30 meter long ski is shown for various speeds in FIG. 7. As can be seen in FIG. 7, the pressure distribution in porous material 16 under the ski does not significantly increase above 4.4 m/s since the weight of the train 6 is nearly fully supported at this speed except for the small force on the front wheels 18, as described next.

Figure 8:
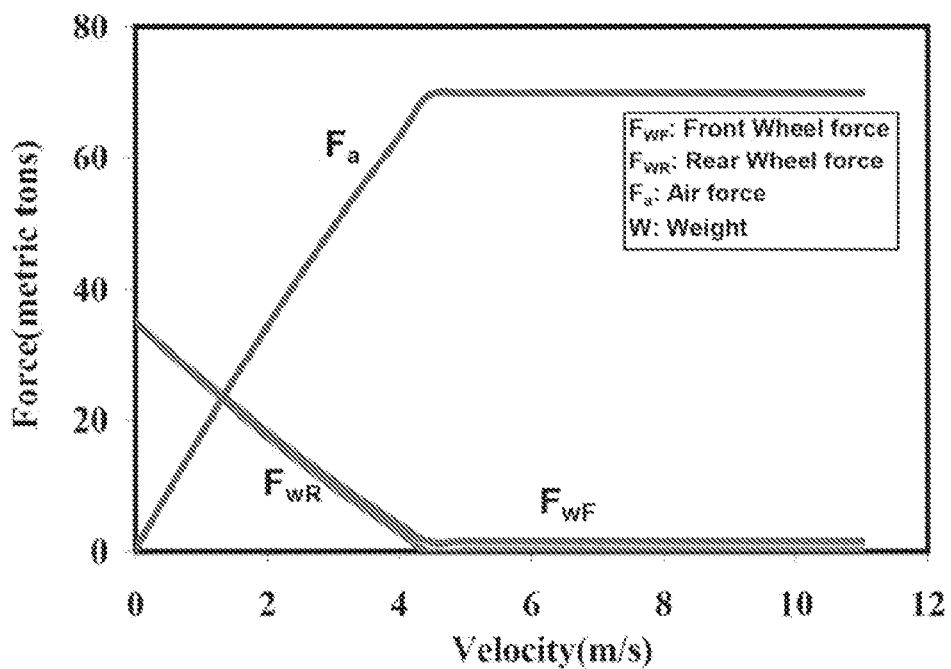
FIG. 8 is a plot showing force versus velocity for the exemplary embodiment of FIG. 7 based on the moment diagram in FIG. 5.
Figure 9:
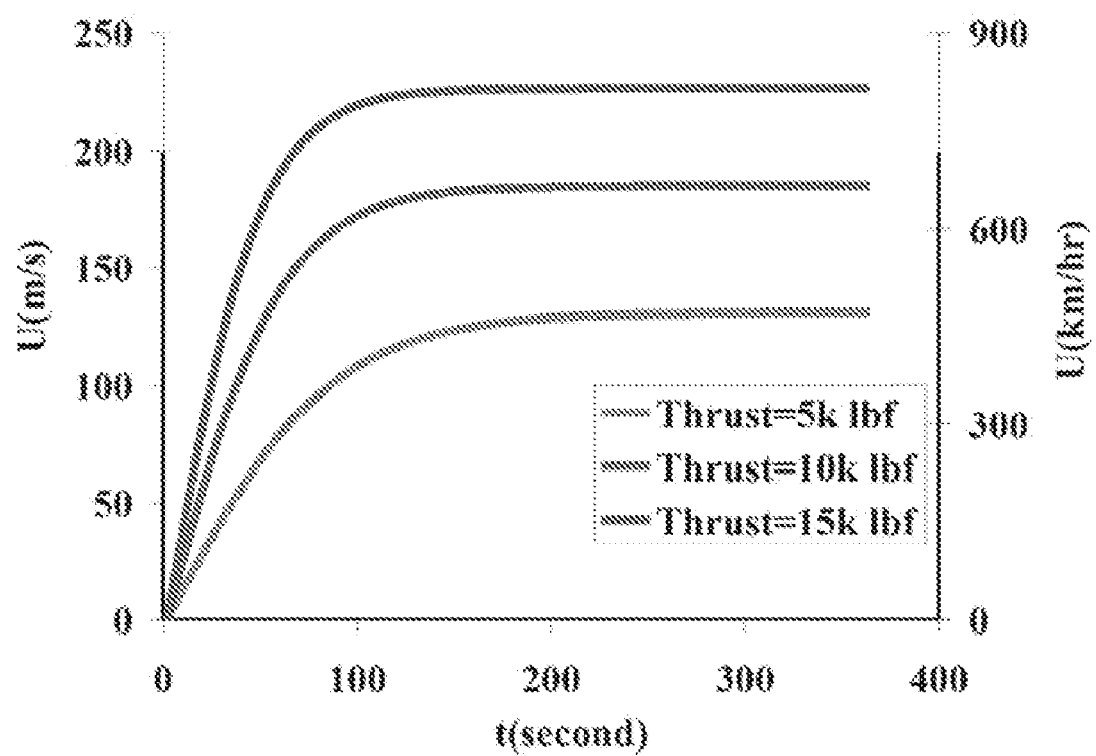
FIG. 9 is a plot showing velocity versus time for the train for various jet thrusts of the exemplary embodiment of FIG. 7.

As shown in FIG. 8, the pressure distribution in the air creates a resultant lift force F, that begins to support the weight of the train at very modest velocities. At a speed of 4.4 m/s the lift force $F_a$ from the air is able to support almost the entire weight, of the train. Above this speed, the force on the rear wheel $F_{wR}$ is at zero and the front wheel is subjected to a force $F_{wF}$ of approximately 1.0 metric tons. Compared to the 70 metric ton weight of the train, the force on the front wheels $F_{wF}$ is very small. The plot shown in FIG. 8 demonstrates that almost all of the lift force for train 2 is provided by the air and only a very small lift force of approximately 0.13 metric tons is provided by the solid structure of the porous material 16. Because the friction between ski 10 and porous material 16 is proportional to the lift force generated by porous material 16 itself, the friction is also very small. As a result, the train is able to accelerate to high speeds quickly. A plot showing the speed of the exemplary train with respect to time is shown in FIG. 9 for three different thrust forces. At a thrust of 10,000 lbs, the train can attain speeds of over 400 mph (670 km/hr), which would allow roundtrip travel between New York City and Washington D.C. in seventy-five minutes.

When the train reaches speeds of about 100 km/hr or greater, adjustable airfoil 46 is tilted to an angle that provides enough lift to counter the turning moment caused by the lift force provided by the air. At these high speeds the front wheel may also be retracted so that train 2 is supported by the air in the porous material and the lift provided by the adjustable airfoil. Accordingly, the train can provide comfortable and high speed travel for the same number of passengers as a jet plane without the fuel consumption required by planes to lift them to normal cruising altitudes.

Although the preferred form of the invention has been shown and described, many features may be varied, as will readily be apparent to those skilled in this art. It is the intention, therefore, to be limited only as indicated by the claims appended hereto.

What is claimed is:

1. A vehicle system comprising:
   a vehicle including:
      a train,
      a ski surface disposed below the train, and
      a propulsion system attached to the train to provide thrust to propel the train; and
   a track including:
      a channel having a first impermeable side, a second impermeable side opposite the first impermeable side, and a bottom, and
      a porous material including a plurality of fibers of substantially uniform radius, the porous material being disposed within the channel above the bottom and extending from the first impermeable side to the second impermeable side, the porous material having air disposed therein and configured such that the air substantially supports the weight of the vehicle when the vehicle travels above a predetermined velocity, wherein the ski surface has a front end and a trailing edge and is configured to have a downward tilt angle toward the trailing edge with respect to the top surface of the porous material when the vehicle is propelled along the track by propulsion system such that air within the porous material provides a lift force on the ski surface.

2. The vehicle system of claim 1, wherein the plurality of fibers comprise polyester fibers.

3. The vehicle system of claim 1, wherein the plurality of fibers are arranged in a random matrix.

4. The vehicle system of claim 1, wherein the fibers are of substantially uniform radius between 3 μm and 10 μm.

5. The vehicle system of claim 3, wherein the fibers are of substantially uniform radius of about 5 μm.

6. The vehicle system of claim 1, wherein a protective screen is disposed over the porous material.

7. The vehicle system of claim 1, wherein the vehicle further comprises wheels and the track further comprises rails configured to receive the wheels, the wheels being adapted to bear a portion of the weight of the vehicle when the vehicle travels below the predetermined velocity.

8. The vehicle system of claim 7, wherein a height of the wheels is adjustable with respect to the ski surface.

9. The vehicle system of claim 1, wherein the ski surface is disposed on a ski extending from a bottom of the train.

10. The vehicle system of claim 1, wherein the propulsion system includes at least one jet engine.

11. The vehicle system of claim 10, wherein the at least one jet engine is rotatable so as to face forward or backward.

12. The vehicle system of claim 1, wherein a width of the ski surface is substantially equal to a distance between the first impermeable side and the second impermeable side.

13. The vehicle system of claim 1, wherein the vehicle includes at least one adjustable airfoil disposed in a vicinity of a front end of the train with respect to a direction of travel.

14. A vehicle track for a train including a ski surface, the track comprising:
   a channel having a first impermeable side, a second impermeable side opposite the first impermeable side, and a bottom, and
   a porous material including a plurality of fibers of substantially uniform radius, the porous material being disposed within the channel above the bottom and extending from the first impermeable side to the second impermeable side, the porous material having air disposed therein and configured such that the air substantially supports a weight of the vehicle when the vehicle travels along the track above a predetermined velocity.

15. The vehicle track of claim 14, wherein the plurality of fibers include polyester fibers.

16. The vehicle track of claim 15, wherein the fibers include polyester with a small addition of silk.

17. The vehicle track of claim 14, wherein the fibers are arranged in a random matrix.

18. The vehicle track of claim 14, wherein the fibers are of substantially uniform radius between 3 μm and 10 μm.

19. The vehicle track of claim 18, wherein the fibers are of substantially uniform radius of about 5 μm.

20. The vehicle track of claim 14, wherein the porous material is disposed in an impermeable a membrane that lines the bottom, and both sidewalls of the channel and a protective screen disposed above the porous material.

* * * * *